US012022774B1

(12) United States Patent
Buss (10) Patent No.: US 12,022,774 B1
(45) Date of Patent: *Jul. 2, 2024

(54) FLOWERING PLANT GROWING SYSTEM AND METHOD OF USING SAME

(71) Applicant: Jeffrey Fitzgerald Buss, Chino ValleyChino Valley, AZ (US)

(72) Inventor: Jeffrey Fitzgerald Buss, Chino ValleyChino Valley, AZ (US)

(*) Notice: Subject to any disclaimer, the term of this patent is extended or adjusted under 35 U.S.C. 154(b) by 174 days.

This patent is subject to a terminal disclaimer.

(21) Appl. No.: 17/696,073

(22) Filed: Mar. 16, 2022

Related U.S. Application Data

(63) Continuation-in-part of application No. 16/666,398, filed on Oct. 28, 2019, now Pat. No. 11,304,385.

(60) Provisional application No. 62/752,315, filed on Oct. 29, 2018.

(51) Int. Cl.
*A01G 13/02* (2006.01)

(52) U.S. Cl.
CPC ..... *A01G 13/0206* (2013.01); *A01G 13/0237* (2013.01)

(58) Field of Classification Search
CPC ............... A01G 13/02; A01G 13/0206; A01G 13/0237; A01G 13/0243; A01G 13/10; A01G 17/04; A01G 17/06; A01G 17/10; A01G 22/05; A01G 22/60
USPC ..... 47/24.1, 25.1, 29.5, 30, 39, 42–47, 66.6, 47/70
See application file for complete search history.

(56) References Cited

U.S. PATENT DOCUMENTS

| 4,858,380 | A | 8/1989 | Gayle | |
|---|---|---|---|---|
| 11,178,825 | B2* | 11/2021 | Ahl | A01G 9/12 |
| 2010/0175319 | A1* | 7/2010 | Meeks | B65D 19/06 |
| | | | | 47/79 |
| 2010/0320110 | A1* | 12/2010 | Dougherty | A01G 9/02 |
| | | | | 137/565.17 |
| 2011/0197505 | A1 | 8/2011 | Hansen | |
| 2019/0037779 | A1 | 2/2019 | Chirco | |

* cited by examiner

*Primary Examiner* — Peter M Poon
*Assistant Examiner* — Danielle A Clerkley
(74) *Attorney, Agent, or Firm* — Invention To Patent Services; Alex Hobson (57) ABSTRACT

A flowering plant growing system utilizes a flowering plant growth assembly that enables the limbs of a flowering plant to be retained and supported along a bud platform to spread the growth out in a planar configuration. This type of growth arrangement may stimulate the plant to produce buds that are distributed across the bud platform and may grow up from the bud platform toward a cover. The height of the bud platform and cover may be adjustable as they are secured to vertical supports by retainers.

13 Claims, 9 Drawing Sheets

FLOWERING PLANT GROWING SYSTEM AND METHOD OF USING SAME

CROSS REFERENCE TO RELATED APPLICATIONS

This application is a continuation in part of U.S. patent application Ser. No. 16/666,398 filed on Oct. 28, 2019, which claims the benefit of priority to U.S. provisional application No. 62/752,315, filed on Oct. 29, 2018; the entirety of all prior applications are hereby incorporated by reference herein.

BACKGROUND OF THE INVENTION

Field of the Invention

This application is directed to a flowering plant growing system that comprises a flowering plant growth assembly that enables the limbs of a flowering plant to be retained and supported along a bud platform to spread the growth out in a planar configuration.

Background

There are many types of flowering plants and it is desirable in commercial applications to grow and produce buds and/or flowers in the most economical way possible. Many plants will produce various quality of buds depending on the amount of light they receive and depending on how far they are from the roots. In some cases, buds and flowers that are further away from the roots will have diminished output and quality. Furthermore, there are government costs and fees associated with growing certain types of regulated plants such as *Cannabis* that are dependent on the number of plants grown. Therefore, producing the most product from a single plant is desirable. In other situations, only a certain number of plants are allowed to be grown by an individual or business and again, therefore it is desirable to produce as many buds, flowers or produce as possible from each plant.

SUMMARY OF THE INVENTION

The invention is directed to a flowering plant growing system that utilizes a flowering plant growth assembly that enables the limbs of a flowering plant to be retained and supported along a bud platform to spread the growth out in a planar configuration. The limbs and buds being retained in a planar configuration enables the buds to receive a substantially uniform amount of light and therefore grow more uniformly. This type of growth arrangement may stimulate the plant to produce buds that are distributed across the bud platform and may grow up from the bud platform. The height of the bud platform and a cover over the bud platform may be adjustable as they are secured to vertical supports by retainers.

This flowering plant growth assembly may be well suited for growing *cannabis* because of the regulations and associated cost as detailed in the Background. *Cannabis*, like many other plants, grow in a pattern call "apical dominance". This means that the plant will force a single tip toward the light. This is called the apical tip. The tips produce the largest flowers and the apical tip produces the overwhelmingly largest flower of all. Plants produce hormones called auxins. The tips make a form of auxins called indole-3-acetic-acid (IAA). At different levels IAA can either promote or hinder growth in different parts of the plant. In apical type plants, IAA will focus the flower growth into highest tip and hinder lower flower growth. This not only hinders the size of flowers the lower they are on the plant but also lowers the percentage of tetrahydrocannabinol (THC) and other compounds in the lower flowers.

When the apical tip is either removed or bent over lower than the lower branches the IAA auxins will trigger some of the lower branches to begin fighting for the light and take over being apical tip. If all branches are bent to an even horizontal height the IAA auxins will trigger all the tips to act as apical tips with unhindered flower development throughout. This creates evenly sized flowers as well as more uniform concentrations of THC and other compounds in all tips or buds of the plant.

An exemplary flowering plant growth assembly comprises a deck that may be a portable deck. A portable deck is portable in size and may comprise a pallet-jack opening between a top and bottom deck support to allow forks of a pallet jack to fit therein. A deck may be made out of wood or plastic or metal, or any other suitable material. A deck may have a deck platform that can support a root enclosure, one or more pots or a fabric root enclosure, for example. A deck grid, such as a metal screen may be configured over the upper supports of the deck. This open structure of the deck may promote growth and provide aeration to the roots and growing medium in the root enclosure. An exemplary deck may have any suitable dimension such as about 0.5 m or more, about 1 m or more about 2 m or more, no more than about 3 m and any range between and include the dimensions provided. An exemplary deck is square having a length of about 1 m and width of about 1 m or about 36 inches×36 inches.

An exemplary deck comprises deck vertical support retainers that are configured to receive and retain a vertical support. The vertical supports may be detachably attachable to the deck vertical support retainers. An exemplary deck vertical support retainer may be a sleeve to receive the vertical support and the sleeve may have a closed end or may have a clamp that is utilized to clamp down around the vertical support to retain it in a desired position. A deck may have three, four or more vertical support retainers.

A vertical support may be any cross-sectional shape, however a cylindrical shape or round cross section is preferred as it facilitates movement and adjustment of the vertical support or bud platform attached thereto. A vertical support may be a metal or plastic tube, for example.

An exemplary flowering plant growth assembly comprises a bud platform that is coupled to the vertical supports at a desired height above the flowering plant or the deck. When a flowering plant reaches a desired height, a bud platform may be coupled to the vertical supports and the limbs of the flowering plant may be configured above the bud platform. A fastener grid may be placed on the bud platform or may be part of the bud platform. A fastener grid may have fastener grid slots to allow the limbs of the flowering plant to be retained within the slot, thereby eliminating the need to pull the limbs through a closed opening in the fastener grid. The fastener grid may have grid openings of any suitable dimension such as about 50 mm or more, about 75 mm or more, about 100 mm or more and any range between and including the fastener grid opening dimensions provided. An exemplary fastener grid has square openings with a dimension of about 100 mm×100 mm (4 inch×4 inch). A fastener grid may be made out of any suitable material but is preferably a material that is water resistant such as plastic or a suitable metal, such as galvanized metal or stainless steel.

As the plants continue to grow the limbs may be secured to the bud platform or fastener grid by fasteners, such as clips or ties, such as plastic wire ties, for example. The limbs may extend out horizontally over the planar bud platform and therefore receive substantially uniform light exposure. When the plant is ready, the light, water and/or nutrients may be altered to cause the plant to begin to bud. As the buds grow up from the bud platform, a cover may be configured above the bud platform to support the buds and/or limbs coupled thereto. An exemplary bud platform may have any suitable dimension including, but not limited to about 0.5 m or more, about 0.75 m or more, about 1 m or more, about 1.25 m or more, about 1.5 m or more, about 2 m or more and any range between and including the dimensions provided. In an exemplary embodiment the bud platform is square having dimension of about 1.2 m×1.2 m, or about (4 ft×4 ft.) In an exemplary embodiment, the bud platform is larger than the deck in length and/or width, or planar area (length× width). In an exemplary embodiment, the deck is about 36 inches×36 inches and the bud platform is about 48 inches× 48 inches. The larger bud platform may allow the limbs and buds to spread out over a greater area than the deck area, thereby producing more buds or flowers.

An exemplary cover may be a flexible cover, such as a net or netting material. A cover may be secured above the bud platform by cover vertical supports that extend up from the bud platform or from the base. The bud platform may comprise cover vertical support retainers to secure the cover vertical supports thereto. An exemplary cover may be configured a distance above the bud platform of about 10 cm (4 inches) or more, about 15 cm (6 inches) or more, about 20 cm (8 inches) or more, about 25 cm (10 inches) or more, about 30 cm (12 inches) or more and any range between and including the dimensions provided. The height of the cover may be adjustable by moving the vertical supports within the vertical support retainers. The cover may be a flexible cover, such as a net and the net may have smaller openings than the fastener grid openings. In an exemplary embodiment, the cover openings dimension are about 25 mm or more, about 50 mm or more, about 75 mm or more, about 100 mm or more and any range between and including the values provided. In an exemplary embodiment, the cover opening dimensions are smaller than the opening dimensions of the fastener grid.

The summary of the invention is provided as a general introduction to some of the embodiments of the invention, and is not intended to be limiting. Additional example embodiments including variations and alternative configurations of the invention are provided herein.

BRIEF DESCRIPTION OF THE SEVERAL VIEWS OF THE DRAWINGS

The accompanying drawings are included to provide a further understanding of the invention and are incorporated in and constitute a part of this specification, illustrate embodiments of the invention, and together with the description serve to explain the principles of the invention.

Corresponding reference characters indicate corresponding parts throughout the several views of the figures. The figures represent an illustration of some of the embodiments of the present invention and are not to be construed as limiting the scope of the invention in any manner. Further, the figures are not necessarily to scale, some features may be exaggerated to show details of particular components. Therefore, specific structural and functional details disclosed herein are not to be interpreted as limiting, but merely as a representative basis for teaching one skilled in the art to variously employ the present invention.

DETAILED DESCRIPTION OF THE ILLUSTRATED EMBODIMENTS

As used herein, the terms "comprises," "comprising," "includes," "including." "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Also, use of "a" or "an" are employed to describe elements and components described herein. This is done merely for convenience and to give a general sense of the scope of the invention. This description should be read to include one or at least one and the singular also includes the plural unless it is obvious that it is meant otherwise.

Certain exemplary embodiments of the present invention are described herein and are illustrated in the accompanying figures. The embodiments described are only for purposes of illustrating the present invention and should not be interpreted as limiting the scope of the invention. Other embodiments of the invention, and certain modifications, combinations and improvements of the described embodiments, will occur to those skilled in the art and all such alternate embodiments, combinations, modifications, improvements are within the scope of the present invention.

A portable deck, as used herein, is a deck that is configured to receive pallet-jack forks such that the portable deck and the plants and plant growing assembly coupled thereto can be moved by the pallet-jack or a fork truck.

A retainer as used herein may be a clamp that clamps down onto a support or it may have apertures to secure a support, such as a vertical support by insertion of a pin through the aperture and into a receiver of the support, such as an aperture. A support may have a plurality of apertures along the length of the support to enable changing the height of a bud platform, or a cover for example.

Figure 1:
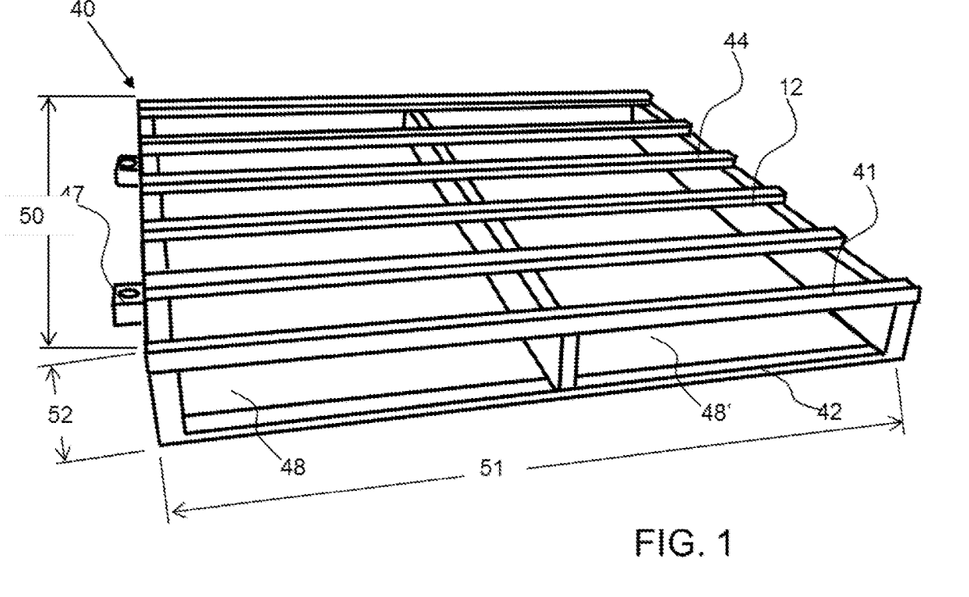
FIG. 1 shows a perspective view of an exemplary deck of a flowering plant growing assembly.

As shown in FIG. 1, an exemplary deck 40 of a flowering plant growing assembly 12 has a plurality of top deck supports 41 and bottom deck supports 42. A pair of pallet-jack openings 48, 48' are configured to enable the deck to be moved with a pallet-jack. Four deck vertical support retainers 47 are attached to the deck to receive and secure vertical supports. The deck has a length 50, width 51 and a height 52. The length and width may be about 36 inches by 36 inches.

Figure 2:
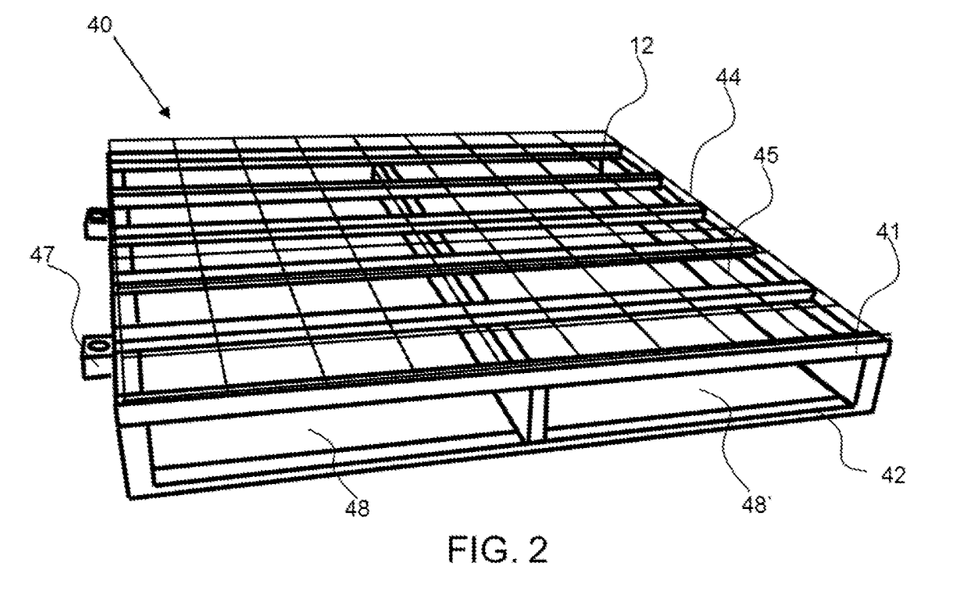
FIG. 2 shows a perspective view of an exemplary deck with a deck grid configured thereon.

As shown in FIG. 2, a deck grid 45 is configured on the top of the deck. The deck grid may be wire and may form a deck platform 44 for supporting root enclosures of plants, such as pots or a fabric root enclosure. The deck grid has a plurality of openings to allow draining of any water from the root enclosure. The deck openings may be large enough to allow drainage from the root enclosure and airflow thereunder. The deck or deck platform may form a horizontal platform for resting a growing enclosure thereon, such as a pot or fabric root enclosure or fabric pot.

Figure 3:
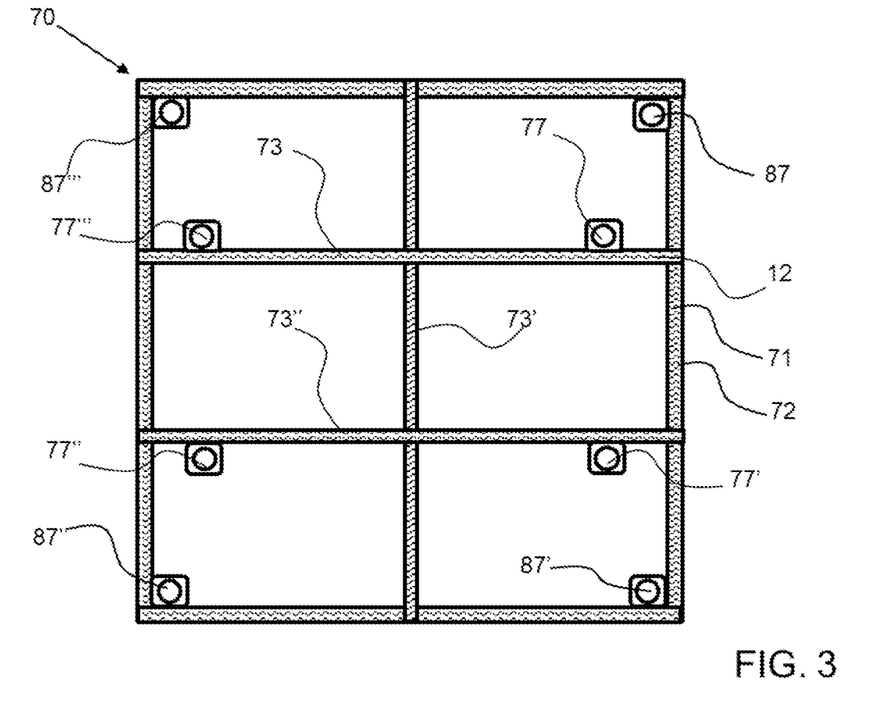
FIG. 3 shows a top view of an exemplary bud platform having both bud platform vertical support retainers and cover support retainers.

As shown in FIG. 3, an exemplary bud platform 70 has both bud platform vertical support retainers 77 and cover support retainers 87. The bud platform has a bud platform frame 71 comprising perimeter supports 72 and interior supports 73 that extend across the interior to the perimeter supports. The bud platform has bud platform vertical support retainers 77-77''' for coupling the bud platform to the deck and cover support retainers 87-87''' for receiving a cover support.

Figure 4:
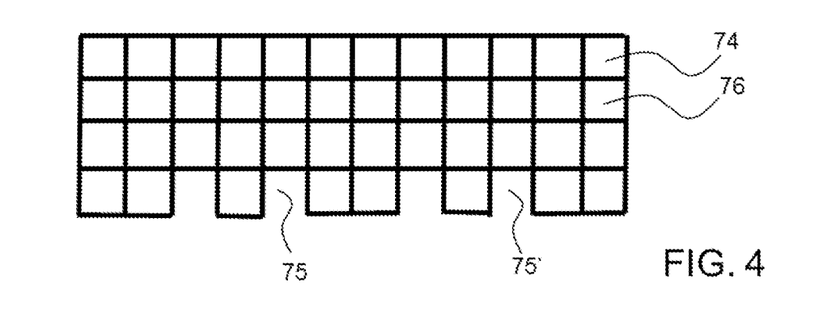
FIG. 4 shows a top view of an exemplary fastener grid having grid slots for fitting around the stalk or limbs of a plant.
Figure 5:
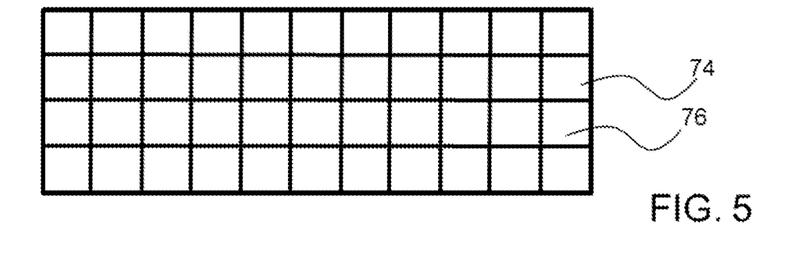
FIG. 5 shows a top view of an exemplary fastener grid that may be used in a center area of the bud platform.

Referring to FIGS. 4 and 5, exemplary fastener grids 74 are configured on the bud platform to support the limbs of the plant and buds. The fastener grid has fastener grid opening 76 having a size as described herein. The fastener grid shown in FIG. 4 has a plurality of grid slots 75, 75' to facilitate placement of the limbs of the plant. The limbs of the plant may extend through these openings. The fastener grid shown in FIG. 4 may be used on the outside portion of the bud platform and the fastener grid shown in FIG. 5 may be used in the center portion of the bud platform.

Figure 6:
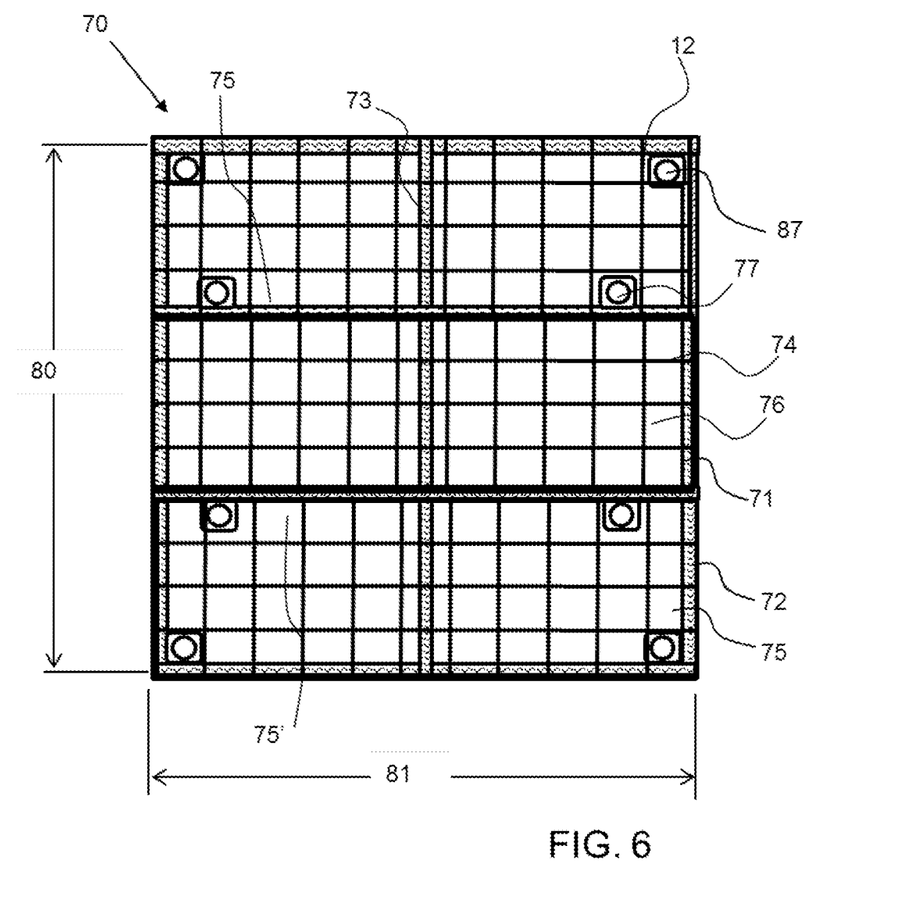
FIG. 6 shows a top view of a bud platform frame with three fastener grids retained thereon.

As shown in FIG. 6, three fastener grids 74 are retained on a bud platform 70. Note the location and orientation of the fastener grid slots 75. Again, these openings facilitate orienting the plant through the fastener grid. The outer fastener grids can be slid onto the bud platform and the plant or limbs of the plant can be configured in these slots. The bud platform 70 has a length 80 and a width 81.

Figure 7:
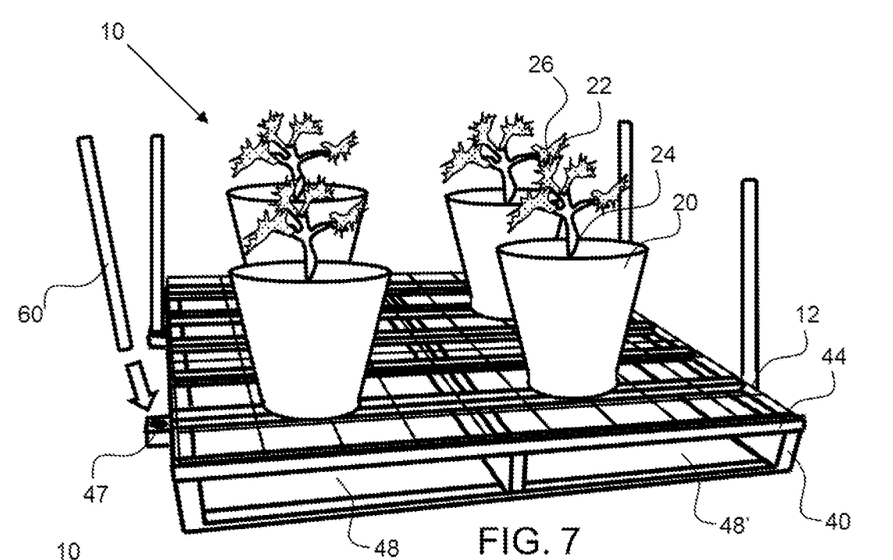
FIG. 7 shows a perspective view of a deck platform having four plants in pots configured on the deck grid and the vertical support in the deck vertical support retainers.

As shown in FIG. 7, an exemplary flowering plant growth assembly 12 comprises a deck 40 and deck platform 44.

Four exemplary root enclosures 20, or pots, are configured on the deck platform and have plants 22 growing therein. The vertical supports 60 are secured to the deck by the deck vertical support retainers 47. The flowering plants 22 may grow until they reach a desire height before the bud assembly is coupled to the vertical supports 60.

Figure 8:
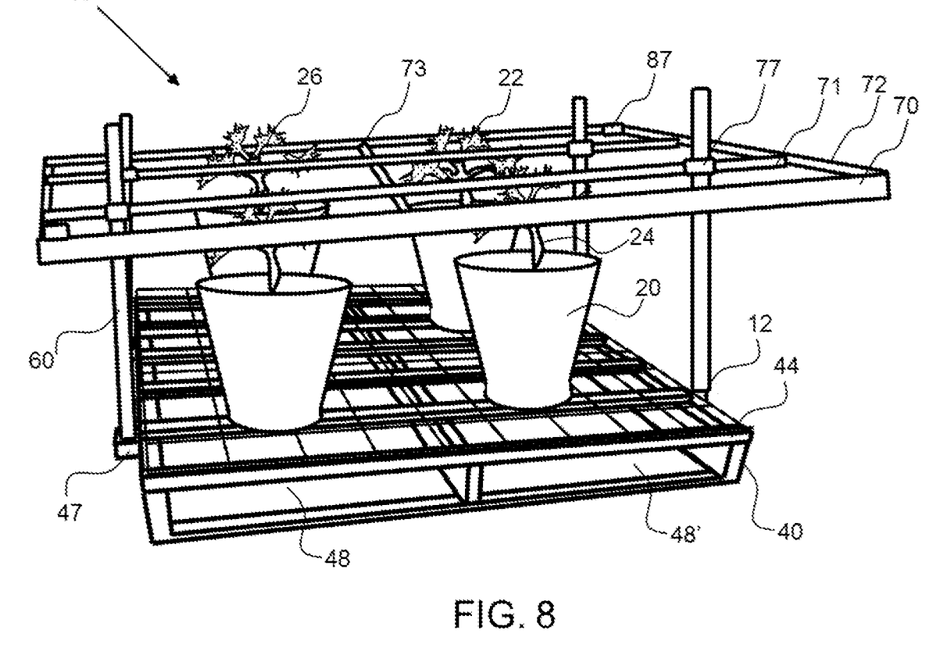
FIG. 8 shows a perspective view of the deck platform shown in FIG. 7, with the bud platform coupled to the vertical supports above the plant.

As shown in FIG. 8, the exemplary flowering plant growth assembly 12 shown in FIG. 7 has a bud platform 70 coupled to the vertical supports 60 by bud platform vertical support retainers 77. As shown, the plants 22 are growing up above the bud platform. As described herein, a plant may be trained or pruned to produce a plurality of main limbs 26 or stalks 24 so that the plant can spread out over the bud platform in a more uniform manner.

Figure 9:
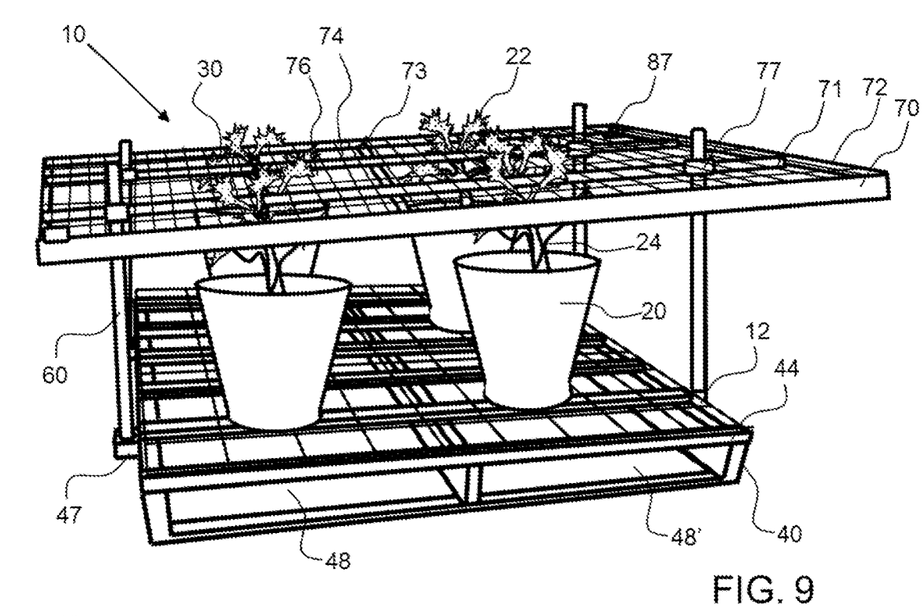
FIG. 9 shows a perspective view of the deck platform shown in FIG. 8, with the fastener grid coupled to the bud platform and the limbs of the plant secured to the fastener grid.

As shown in FIG. 9, the exemplary flowering plant growth assembly 12 shown in FIG. 8 now has the fastener grids 74 configured on the bud platform 70 and the limbs 26 of the plant secured to the fastener grid by fasteners 30, such as clips or ties, such as wire-ties. The bud platform and/or the fastener grid configured thereon may be oriented to produce a substantially horizontal and planar platform above the deck platform for the plant to grow thereon. Substantially horizontal as used herein is within about 25 degrees of horizontal, and preferably within about 15 degrees of horizontal.

Figure 10:
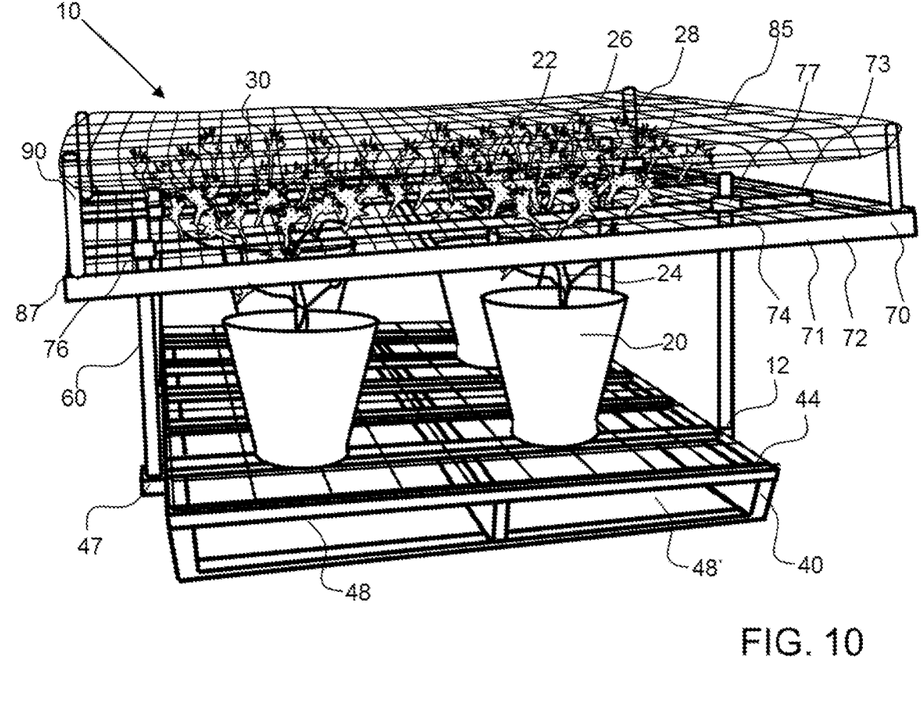
FIG. 10 shows a perspective view of the deck platform shown in FIG. 9, with the cover coupled to the cover vertical supports and secured over the buds of the plant to support them.

As shown in FIG. 10, the exemplary flowering plant growth system 10 comprises a versatile flowering plant growth assembly 12. The flowering plant growth assembly shown in FIG. 9 now has a cover 85, such as a flexible net or netting material configured over the plants 22. The cover is supported by the cover vertical supports 90 that are secured to the bud platform 70 by the cover support retainers 87. The buds 28 of the flowering plant may be supported by the cover material and may protrude through openings in the cover material and be supported in a vertical orientation. Fasteners 30, such as clips or ties, may be used to secure the buds to the cover.

Figure 11:
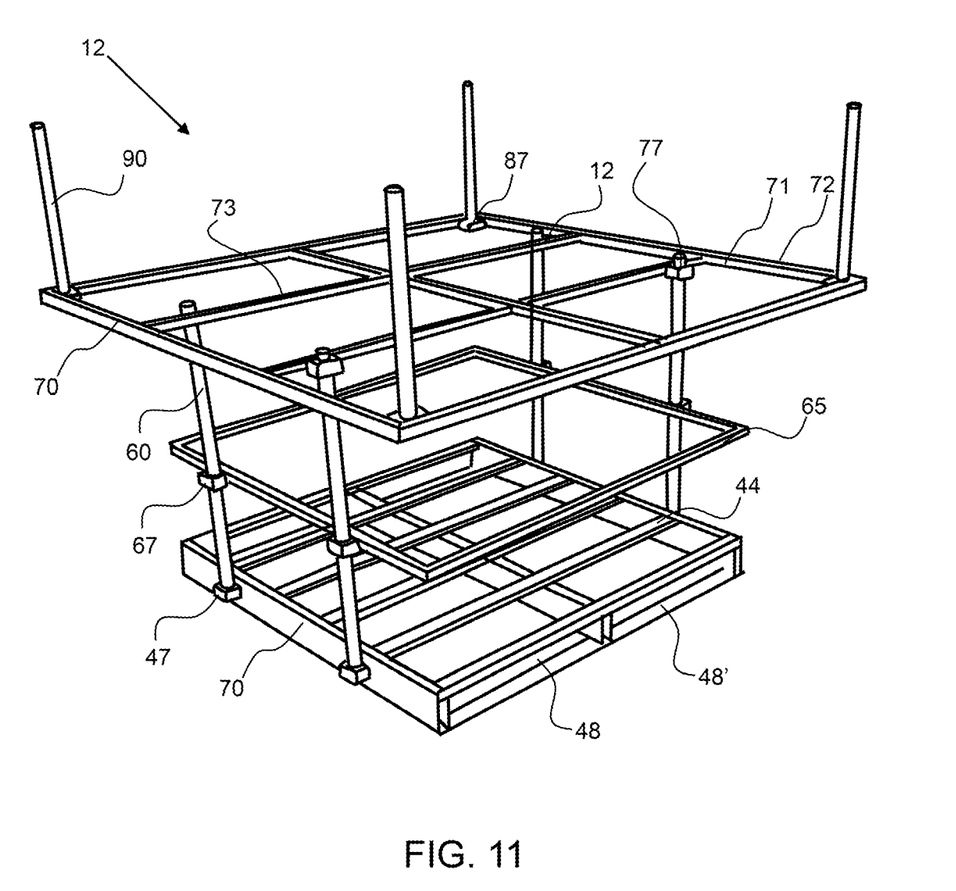
FIG. 11 shows a perspective view of an exemplary flowering plant growth assembly having a root enclosure frame coupled to the vertical supports by root enclosure vertical support retainers.

As shown in FIG. 11, an exemplary flowering plant growth assembly 12 comprises a root enclosure frame 65 coupled to the vertical supports 60 by root enclosure vertical support retainers 67. The root enclosure frame may be used to form a flexible or fabric root enclosure.

Figure 12:
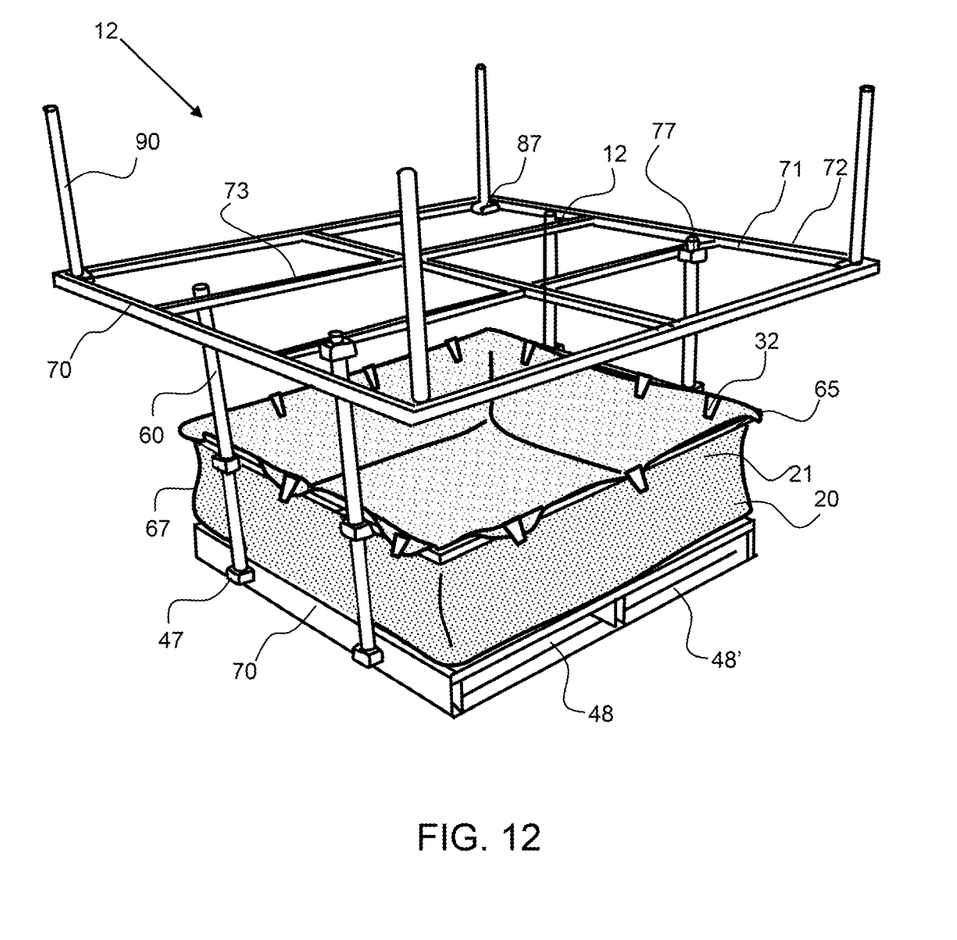
FIG. 12 shows a perspective view of the exemplary flowering plant growth assembly shown in FIG. 11 with the fastener grid configured on the bud platform and the root enclosure coupled to the root enclosure frame.

As shown in FIG. 12, the exemplary flowering plant growth assembly 12 shown in FIG. 11 has a flexible root enclosure 21 secured to the root enclosure frame 65 by clamps 32.

Figure 13:
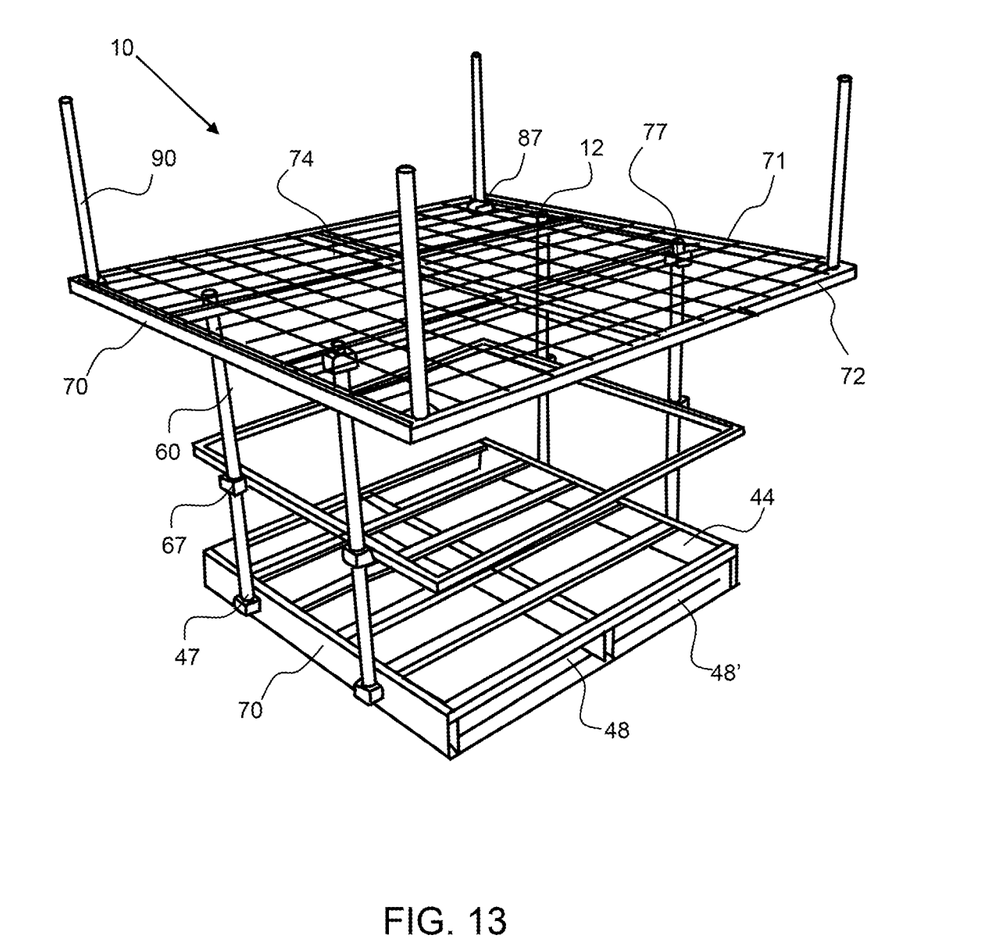
FIG. 13 shows a perspective view of the bud platform, fastener grid and cover removed from the flowering plant growth assembly for the purpose of drying the buds.

As shown in FIG. 13, the exemplary flowering plant growth assembly 12 shown in FIG. 11 now has a fastener grid 74 configured on the bud platform 70.

Figure 14:
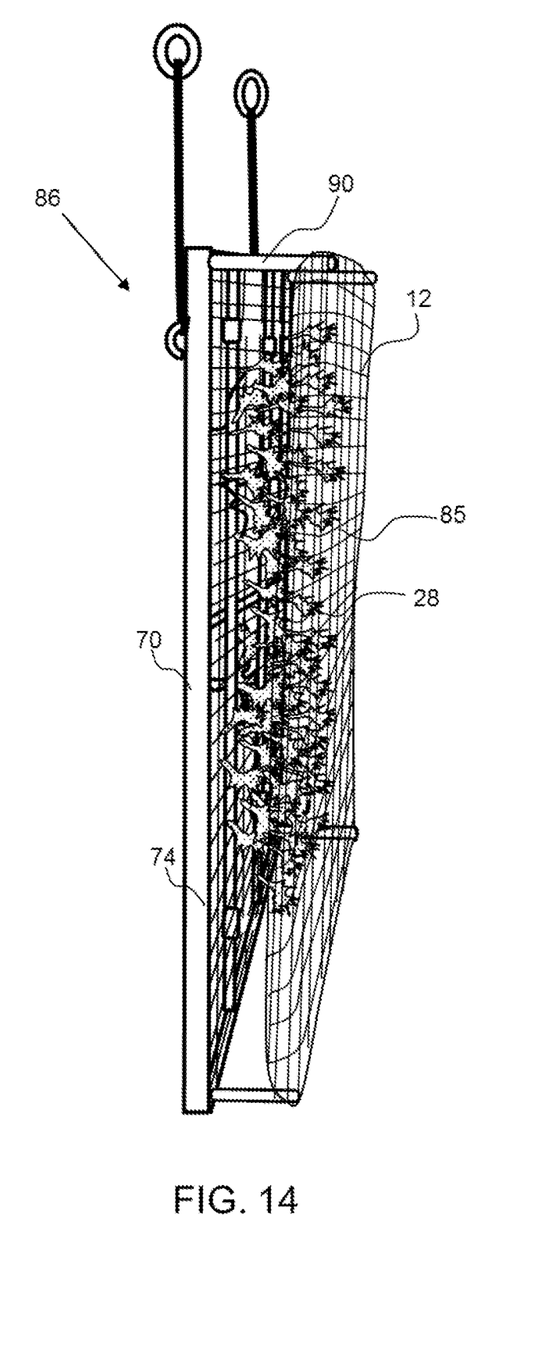
FIG. 14 shows a perspective view of the bud platform and fastener grid removed from the flowering plant growth assembly for the purpose of drying the buds.

As shown in FIG. 14, the bud platform 70 and cover 85 are removed from the vertical supports to produce a drying assembly 86 for the purpose of drying the buds 28. The drying assembly can be hung up in a controlled environment to dry the buds.

Figure 15:
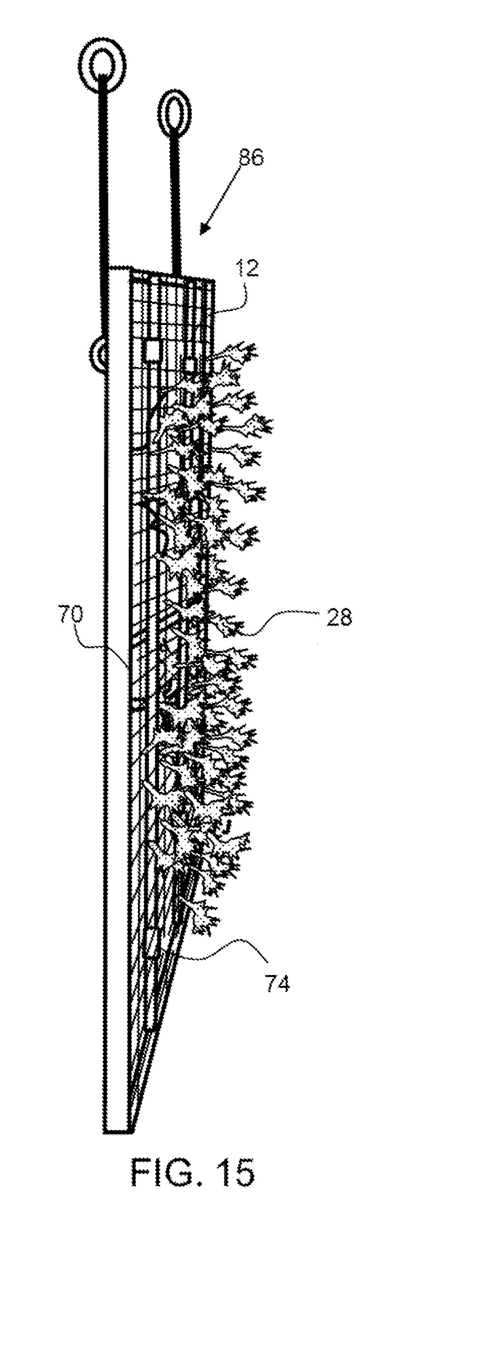
FIG. 15 shows a perspective view of the bud platform and fastener grid removed from the flowering plant growth assembly for the purpose of drying the buds and with the cover removed to allow the buds to be easily collected.

As shown in FIG. 15, the cover 85 of the drying assembly has been removed to enable harvesting the buds from the bud platform.

It will be apparent to those skilled in the art that various modifications, combinations and variations can be made in the present invention without departing from the spirit or scope of the invention. Specific embodiments, features and elements described herein may be modified, and/or combined in any suitable manner. Thus, it is intended that the present invention cover the modifications, combinations and variations of this invention provided they come within the scope of the appended claims and their equivalents.

What is claimed is:

1. A method of growing a flowering plant comprising:
a) providing a flowering plant growing system comprising:
a flowering plant growing assembly comprising:
a deck comprising:
a top deck board;
a bottom deck board; and
a pallet-jack opening configured between the top and bottom deck boards and configured to allow a pallet-jack fork to fit therein; and
wherein the deck is a portable deck and configured for movement via a pallet-jack or a fork truck;
a plurality of vertical supports, wherein the plurality of vertical supports are coupled to the deck and extend upward from the deck;
a bud platform coupled to the plurality of vertical supports and retained above the deck, wherein the bud platform is vertically positionable along the plurality of vertical supports that are coupled to the deck and extend upward from the deck and wherein the bud platform comprises:
a plurality of fastener grid pieces forming a fastener grid having grid openings;
wherein a portion of a flowering plant is secured to the fastener grid thereby fixing a plurality of buds coupled to the flowering plant in close proximity to the bud platform;
a plurality of cover vertical supports;
a cover that is retained above the bud platform to secure portions of said flowering plant thereto and wherein the cover comprises a plurality of cover openings to allow light to pass therethrough;
b) planting a flowering plant and locating said flowering plant on the deck;
c) securing the bud platform to the plurality of vertical supports;
d) attaching a portion of the flowering plant to the fastener grid, said flowering plant having a plurality of buds and thereby fixing the plurality of buds of the flowering plant to the fastener grid;
e) configuring the cover vertical supports to extend up from the bud platform; and
f) placing said cover over the flowering plant and over the bud platform and securing the cover to the plurality of cover vertical supports,
g) cutting the flowering plant to detach a bud portion from the flowering plant;
h) detaching the bud platform from the plurality of vertical supports; and
i) drying the bud portions while attached to the detached bud platform.

2. The method of claim 1, wherein the fastener grid is detachably attachable to and extends over the bud platform and the fastener grid pieces comprise fastener grid slots configured to extend around a limb of said flowering plant.

3. The method of claim 1, wherein the cover is vertically adjustable above the bud platform along the plurality of cover vertical supports extending up from the bud platform.

4. The method of claim 1, wherein the bud platform and the cover are detachably attachable to the plurality of vertical supports.

5. The flowering plant growing system-method of claim 1, wherein the cover is detachably attachable to the plurality of cover vertical supports.

6. The flowering plant growing system-method of claim 1, wherein the deck comprises a root enclosure and wherein said flowering plant is planted in and grows from said root enclosure.

7. The method of claim 6, wherein the root enclosure is a fabric root enclosure and wherein the flowering plant growing assembly further comprises a root enclosure frame that is coupled to the plurality of vertical supports by root enclosure vertical support retainers, and wherein said fabric root enclosure is attached to the root enclosure frame.

8. The flowering plant growing system-method of claim 1, wherein the plurality of vertical supports are detachably attachable to the deck.

9. The method of claim 8, wherein the deck comprises a vertical support retainer.

10. The method of claim 9, wherein the vertical support retainer comprises a clamp.

11. The method of claim 1, wherein the bud platform comprises bud platform vertical support retainers that couples the bud platform to the plurality of vertical supports.

12. The method of claim 1, wherein the plurality of fastener grid pieces include two outer fastener grids and a center fastener grid and wherein the two outer fastener grids comprise said fastener grid slots to enable assembly of the fastener grid around said limb of said flowering plant.

13. The method of claim 1, wherein the plurality of cover openings are smaller in dimension than the grid openings of the fastener grid.

* * * * *